United States Patent
Adini et al.

(10) Patent No.: US 9,092,688 B2
(45) Date of Patent: Jul. 28, 2015

(54) ASSISTED OCR

(71) Applicant: Cisco Technology Inc., San Jose, CA (US)

(72) Inventors: Guy Adini, Rehovot (IL); Harel Cain, Jerusalem (IL); Oded Rimon, Jerusalem (IL)

(73) Assignee: CISCO TECHNOLOGY INC., San Jose, CA (US)

( * ) Notice: Subject to any disclaimer, the term of this patent is extended or adjusted under 35 U.S.C. 154(b) by 101 days.

(21) Appl. No.: 14/012,143

(22) Filed: Aug. 28, 2013

(65) Prior Publication Data

US 2015/0063698 A1 Mar. 5, 2015

(51) Int. Cl.
 *G06K 9/00* (2006.01)
 *G06K 9/18* (2006.01)
 *G06K 9/34* (2006.01)
(52) U.S. Cl.
 CPC . *G06K 9/18* (2013.01); *G06K 9/344* (2013.01)
(58) Field of Classification Search
 None
 See application file for complete search history.

(56) References Cited

U.S. PATENT DOCUMENTS 5,689,585 A * 11/1997 Bloomberg et al. .......... 382/229
5,765,176 A    6/1998 Bloomberg
7,873,183 B2 *  1/2011 He et al. ....................... 382/100
8,081,823 B2  12/2011 Zandifar et al.
8,156,414 B2   4/2012 Zandifar et al.
2008/0063279 A1 *  3/2008 Vincent et al. ............... 382/182
2011/0103713 A1 *  5/2011 Meyer et al. ................. 382/321

OTHER PUBLICATIONS

Yalniz, Ismet Zeki, and Raghavan Manmatha. "A fast alignment scheme for automatic ocr evaluation of books." Document Analysis and Recognition (ICDAR), 2011 International Conference on. IEEE, 2011.*
Jones, Neil C., and Pavel Pevzner. An introduction to bioinformatics algorithms. MIT press, 2004. pp. 177-178.*
"Longest Common Subsequence Problem" (Wikipedia Apr. 11, 2013).

* cited by examiner

*Primary Examiner* — Samir Ahmed
*Assistant Examiner* — Menatoallah Youssef
(74) *Attorney, Agent, or Firm* — Husch Blackwell LLP

(57) ABSTRACT

A method including determining a position of each glyph in an image of a text document, identifying word boundaries in the document thereby implying the existence of a first plurality of words, preparing a first array of word lengths based on the first plurality of words, preparing a second array of word lengths based on a second plurality of words of a text file including a certain text, comparing at least part of the first array to at least part of the second array to find a best alignment between the first and second array, deriving a layout of at least part of the certain text as arranged in the image of the text document at least based on the best alignment and the position of at least some of the glyphs in the image. Related apparatus and methods are also described.

12 Claims, 4 Drawing Sheets

Fig. 3

| | | 40 | | 44 | |
|---|---|---|---|---|---|
| ARRAY 28 | | 7 2 4 10 | 7 2 4 1 4 4 3 2 3 5 3 5 2 2 8 4 5 4 7 | 5 4 2 3 6 | |
| ARRAY 42 | | 8 2 4 10 7 2 4 1 | 4 4 3 2 3 5 3 5 2 2 8 4 5 4 7 8 2 3 6 | 10 4 4 3 4 .... | |
| SCORE | | 0 0 0 0 | 1 1 1 0 0 0 0 0 0 0 1 0 0 0 0 0 0 0 0 0 0 0 0 | 0 1 0 1 0 .... | |

Fig. 4

| ARRAY 28 | 7 2 4 10 7 2 4 1 4 4 3 2 3 5 3 5 2 2 8 4 5 4 7 5 4 2 3 6 |
|---|---|
| ARRAY 42 | 8 2 4 10 7 2 4 1 4 4 3 2 3 5 3 5 2 2 8 4 5 4 7 8 2 3 6 10 4 4 3 4 .... |
| SCORE | 0 0 0 0 0 0 0 0 1 0 0 0 1 0 1 1 0 0 0 0 0 1 0 0 0 0 0 0 0 0 0 0 |

Fig. 5

| ARRAY 28 | 7 5 4 2 3 6 |
|---|---|
| ARRAY 42 | 8 2 4 10 7 2 4 1 4 4 3 2 3 5 3 5 2 2 8 4 5 4 7 8 2 3 6 10 4 4 3 4 .... |
| SCORE | 1 1 1 1 1 1 |

Fig. 6

| | 40 | 44 | 44 |
|---|---|---|---|
| ARRAY 28 | 7 2 4 10 7 2 4 1 4 4 3 2 3 5 3 5 2 2 8 4 5 4 7 | 5 | 4 2 3 6 |
| ARRAY 42 | 8 2 4 10 7 2 4 1 4 4 3 2 3 5 3 5 2 2 8 4 5 4 7 8 2 3 6 10 4 4 3 4 .... | | |
| SCORE | 0 1 1 1 1 1 1 1 1 1 1 1 1 1 1 1 1 1 1 1 1 1 1 0 0 0 0 0 1 0 1 0 .... | | |

| | | | | | | | | | 40 | | | 44 | | | |
|---|---|---|---|---|---|---|---|---|---|---|---|---|---|---|---|
| ARRAY 28 | 5 | 2 | 2 | 8 | 4 | 5 | 4 | 7 | | 5 | | | 4 | 2 | 3 | 6 |
| ARRAY 42 | 5 | 2 | 2 | 8 | 4 | 5 | 4 | 7 | 8 | 2 | 3 | 6 | 10 | 4 | 4 | 3 | 4 .... |
| SCORE | 1 | 1 | 1 | 1 | 1 | 1 | 1 | 1 | -a | -2a | -a | -a | -a | 1 | -2a | 1 | -2a |

| ARRAY 28 | 5 2 2 8 4 5 4 7 5 4 2 3 6 |
| ARRAY 42 | 5 2 2 8 4 5 4 7 8   2 3 6 10 4 4 3 4 3 4 3 2 4 ... |
| SCORE | 1 1 1 1 1 1 1 1 -2a -a 1 1 1 -a -a -a -a -a -a -a -a -a ... |

ARRAY 28    5 2 2 8 4 5 4 7 5 4 2 3 6

ARRAY 42    5 2 2 8 4 5 4 7 8   2 3 6 |10 4 4 3 4 3 4 3 2 4 ...|  58

SCORE       1 1 1 1 1 1 1 1 -2a -a 1 1 1

ASSISTED OCR SYSTEM — 10, PROCESSOR 62, STORAGE MEDIUM, 60

ASSISTED OCR

FIELD OF THE INVENTION

The present invention relates to OCR, and in particular to, assisted OCR.

BACKGROUND OF THE INVENTION

The following references are believed to represent the state of the art:
U.S. Pat. No. 5,765,176 to Bloomberg;
U.S. Pat. No. 7,873,183 to He, et al.;
U.S. Pat. No. 8,081,823 to Zandifar, et al.; and
U.S. Pat. No. 8,156,414 to Zandifar, et al.

BRIEF DESCRIPTION OF THE DRAWINGS

The present invention will be understood and appreciated more fully from the following detailed description, taken in conjunction with the drawings in which:

FIG. 3 is a first example showing comparing two word-length arrays for use in the system of FIG. 1;

FIG. 4 is a second example showing comparing two word length arrays for use in the system of FIG. 1;

FIG. 5 is a third example showing comparing two word length arrays for use in the system of FIG. 1;

FIG. 6 is a fourth example showing comparing two word length arrays for use in the system of FIG. 1;

DETAILED DESCRIPTION OF AN EMBODIMENT

In overview, an embodiment of the present invention includes an assisted OCR (optical character recognition) system and method for determining the layout of a certain (known) text as arranged in an image of a text document.

The assisted OCR system and method is generally font-independent and does not assume anything about the graphical layout of the known text. The general approach taken includes matching word lengths in the image to word lengths in the known text.

The assisted OCR system and method typically uses image-processing techniques such as binarization, segmentation of connected components, and distinguishing between inter-character and inter-word spaces of the glyphs in the image, for determining glyph positions and implied word lengths in the image of the text document. Two arrays of word lengths are created, one from the image of the text document and one from a text file including the known text. Dynamic programming or any other suitable problem solving method is typically used to find an optimal matching, or alignment, between the two arrays. Dynamic programming is a method for solving complex problems by breaking them down into simpler problems, until the problem becomes trivial. The match or alignment may be confirmed by comparing the glyphs which are expected to be the same based on the known text to see if the glyphs which are expected to be the same have a high image correlation. The matching can then be corrected, if necessary. The words that were matched in the array of the image file and the array of the text file allow mapping from characters in the text file to glyphs in the image. As the position of each of the glyphs is known, the layout of the known text as arranged in the image can then be determined.

Figure 1:
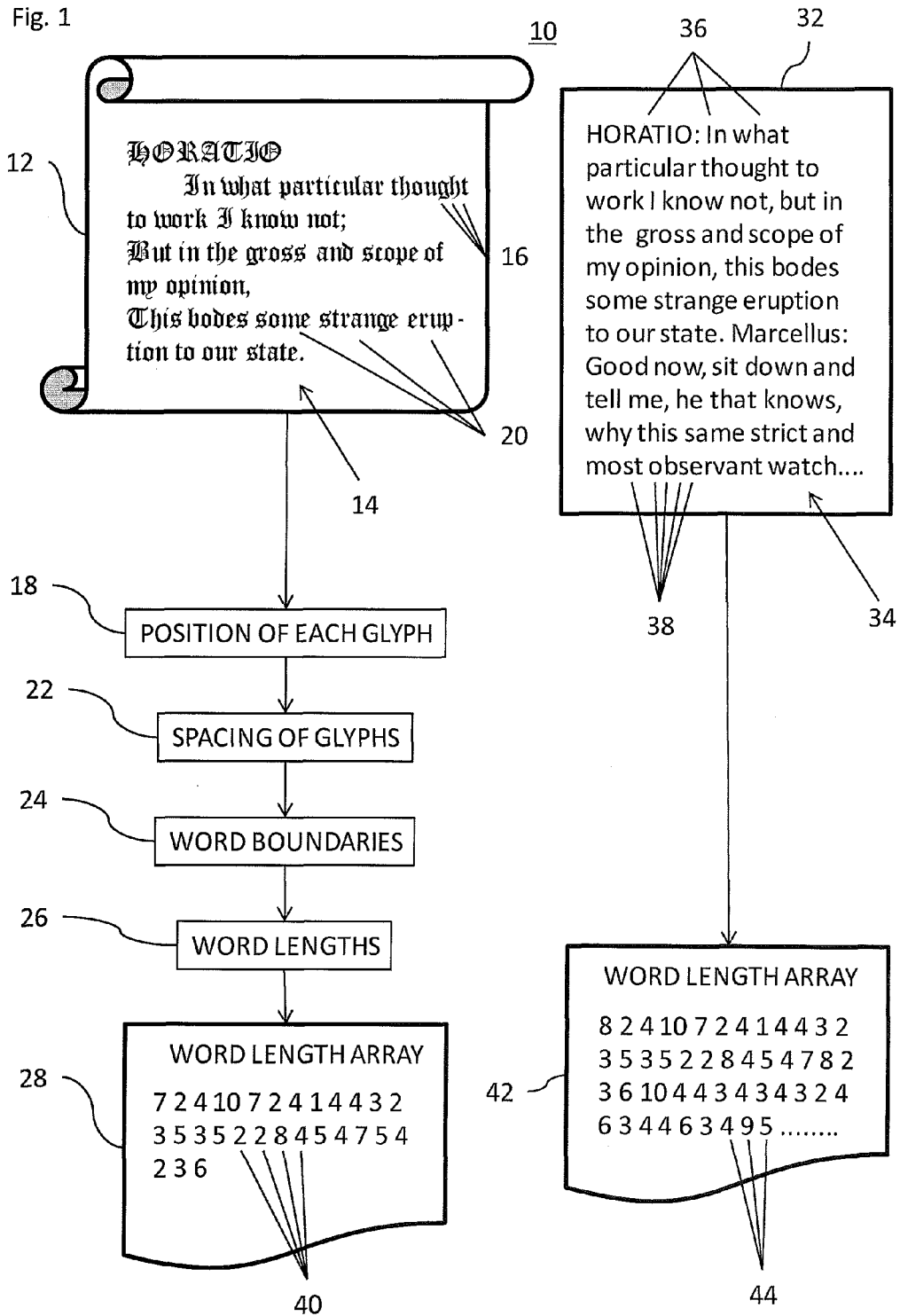
FIG. 1 is a partly pictorial, partly block diagram view of a flow diagram of a first part of a method of operation of an assisted OCR system constructed and operative in accordance with an embodiment of the present invention.

Reference is now made to FIG. 1, which is a partly pictorial, partly block diagram view of a flow diagram of a first part of a method of operation of an assisted OCR system 10 constructed and operative in accordance with an embodiment of the present invention.

An image file 12 including an image of a text document 14 is received for processing by the assisted OCR system 10. The image of the text document 14 includes a plurality of glyphs 16. Only some of the glyphs 16 are labeled in FIG. 1 for the sake of simplicity.

The assisted OCR system 10 is operative to determine a position of each glyph 16 in the image of the text document 14 (block 18) using image-processing techniques. The image processing techniques typically include applying binarization (thresholding) to the image of the text document 14 to convert a grayscale or color image to a black and white (1-bit pixels) image. Lines of text are identified by any suitable image processing technique such as calculating black pixel density in pixel rows, and searching for peaks in the distribution. The image of the text document 14 is typically segmented into connected components ("glyph characters"). Each connected component is assigned to its corresponding text line, determined above. If two components share the same line and same vertical position (for example, the line and dot of the letter 'i'), the components are generally joined and treated as one glyph 16. It should be noted that identifying glyphs in other languages, especially non-Latin alphabets, may be subject to different rules depending on the structure of the language.

The assisted OCR system 10 is operative to determine (in-line or horizontal) spacing of the glyphs 16 in the image of the text document 14 (block 22). The spacing is calculated from the position of the glyphs 16 determined in block 18.

The assisted OCR system 10 is operative to identify word boundaries in the image of the text document 14 from the spacing of the glyphs 16 thereby implying the existence of a plurality of words 20 in the image of the text document 14 (block 24) and a word length 40 for each word 20. The word length 40 is measured by the number of glyphs 16 in the word 20 (block 26). Only some of the words 20 and word lengths 40 are labeled in FIG. 1 for the sake of simplicity.

It should be noted that the word length 40 of a word 20 may be defined to include punctuation attached to the word 20 as a character of the word 20. So for example, a comma or period after a word may count as part of the word preceding the punctuation mark. Alternatively, the word lengths 40 may exclude most (or all) punctuation marks by ignoring all glyphs 16 which are smaller than a certain size. It will be appreciated that certain punctuation marks, such as exclamation marks and questions marks, may be difficult to exclude due to their size and similarity to other characters.

Word boundaries are identified from the spacing of the glyphs 16 by determining whether each space is an inter-character space or an inter-word space. The spacing can be classified by any appropriate supervised or unsupervised learning algorithm such as a k-means algorithm with k=2 for two groups, one group being inter-character and another group being inter-word, on all the horizontal distances in each line. The grouping of spaces into inter and intra-word spaces can also be classified according to some simple non-algorithmic rule such as a per document width threshold, by way of example only.

The assisted OCR system 10 is operative to prepare an array 28 of word lengths 40 based on the word length 40 of each word 20. The array 28 is ordered according to the order in which the words 20 appear in the image of the text document 14.

The assisted OCR system 10 is operative to receive a text file 32 including a certain (known) text 34. The text file 32 includes a plurality of words 36 and a plurality of characters 38. Each word 36 has a word length 44 given by the number of characters 38 in the word 36. Only some of the words 36, characters 38 and the word lengths 44 are labeled in FIG. 1 for the sake of simplicity.

The assisted OCR system 10 is operative to prepare an array 42 of the word lengths 44 based on the word length 44 of each of the words 36. The array 42 is ordered according to the order in which the words 36 appear in the text file 32.

It should be noted that the word length 44 of a word 36 may be defined to include punctuation attached to the word 36 as a character of the word 36. So for example, a comma or period after a word may count as part of the word preceding the punctuation mark. Alternatively, the word lengths 40 may exclude most (or all) punctuation marks. For example, larger punctuation such as question marks and explanation marks may be included when calculating the word lengths 44. It will be appreciated that whether punctuation is included, excluded (partially or fully) when calculating the word lengths 40, 44 used in the arrays 28, 42, it may be better, but not essential, if both word lengths 40, 44 are subject to the same rules regarding inclusion and exclusion of punctuation marks.

It should be noted that starting and/or finishing at a certain offset(s), the arrays 28, 42 of word lengths 40, 44 will be very similar with an occasional insertion or removal of an element possibly due to segmentation errors and small changes to the text, by way of example. In FIG. 1, the image of the text document 14 includes the word "erup-" on one line and "tion" on the next line, while the text file 32 of the certain (known) text 34 includes "eruption" as a single word. Also the image of the text document 14 includes "HORATIO:" with a colon while the text file 32 of the certain (known) text 34 includes the word "HORATIO" without the colon.

Figure 2:
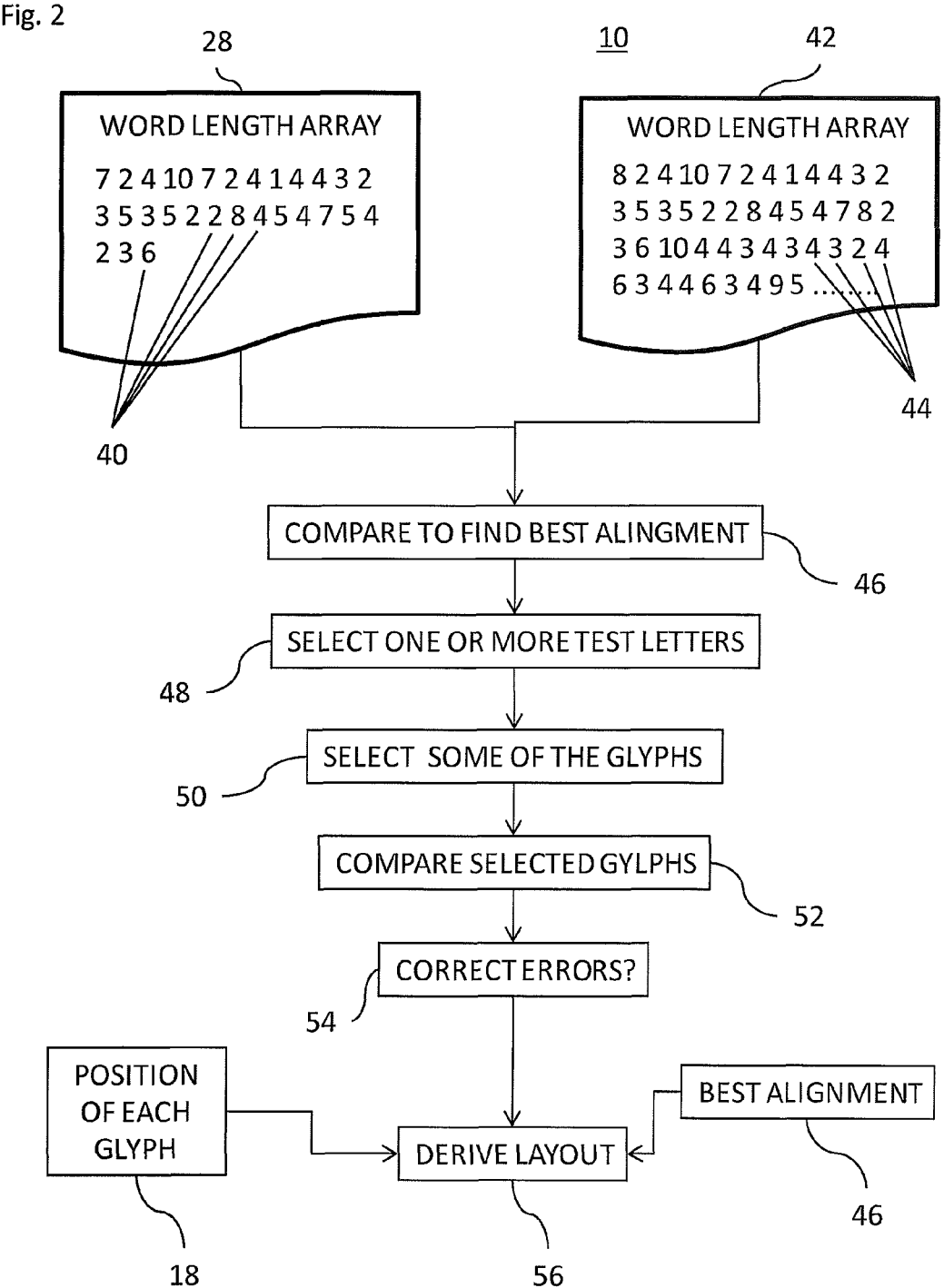
FIG. 2 is a partly pictorial, partly block diagram view of a flow diagram of a second part of the method of operation of the assisted OCR system of FIG. 1.

Reference is now made to FIG. 2, which is a partly pictorial, partly block diagram view of a flow diagram of a second part of the method of operation of the assisted OCR system 10 of FIG. 1.

The assisted OCR system 10 is operative to compare at least part of the array 28 of word lengths 40 to at least part of the array 42 of word lengths 44 in order to find a best alignment between the array 28 of word lengths 40 and the array 42 of word lengths 44 (block 46). The comparison may be performed by searching for the smaller of the arrays 28, 42 in the larger of the arrays 28, 42, but with the assumption that one or both of the arrays 28, 42 has missing, extra, and/or erroneous items.

It should be noted that the best alignment may not just be a simple alignment without gaps between one array and the other but may involve skipping values and contending with mismatches in order to achieve some sort of best alignment.

The best alignment may use any suitable matching technique for example, but not limited to, the Longest Common Subsequence (LCS) matching algorithm or a variant thereof such as Levenshtein distance. The standard LCS matching algorithm is used to find the longest subsequence common to two sequences. The main application of LCS is in the field of bioinformatics for the purpose of comparing and matching DNA sequences, and LCS has various applications in computing, especially in text processing and file comparison. In some embodiments of the present invention, the LCS matching algorithm is enhanced as described with reference to FIGS. 7-9. Using the LCS or similar technique, the assisted OCR system 10 finds the longest common subsequence of the arrays 28, 42.

The comparison method for finding the best alignment is described in more detail with reference to FIGS. 3-9.

In order to provide confidence in the optimal alignment, a glyph-by-glyph comparison is optionally performed, not against an "ideal" model (which cannot be acquired without knowing the font), but rather internally whereby at least some, and possibly all, the glyphs 16 (FIG. 1) that should represent the same character, based on the results of the comparison step (block 46), are compared to each other by a correlation of images. The above glyph-by-glyph comparison is now described in more detail.

The assisted OCR system 10 is operative to select a letter of an alphabet included in the characters of the text file 32 (block 48). The selected letter should be sufficiently frequent in the text file 32, for example, at least five instances, which will typically be from the more frequently used characters in the language, such as 'e', 't', and 'a'.

The assisted OCR system 10 is then operative to select some, or all, of the glyphs 16 (FIG. 1) of the image of the text document 14 (FIG. 1) that correspond to the selected letter of the alphabet based on the best alignment (block 50).

The assisted OCR system 10 is then operative to compare the selected glyphs 16 (FIG. 1) (which are assumed to be identical based on the best alignment) with each other and calculate a correlation of the images of the selected glyphs 16, to provide a level of confidence in the best alignment (block 52).

The above steps of blocks 48-52 may be performed for none, some, or all possible repeating characters selected from the alphabet included in the text file 32 (FIG. 1), or for characters which repeat a certain number of times, or more, such as, 5 times, by way of example only, typically depending on available computing resources and/or required confidence.

If the correlation of the images of the glyphs 16 (FIG. 1) is high enough, then there will be high confidence in the best alignment. The definition of a high correlation may depend on various factors, including the language of the text document 14 (FIG. 1) as appreciated by one ordinarily skilled in the art of image processing and optical character recognition. If the correlation is not high enough, it is an indication that there was an error in the array comparison phase, and some of the letters, the ones that belong to wrongly-matched words—should "stand out" of the crowd and be identified as errors based on the correlation.

Any identified errors may be corrected (block 54) for example by fine tuning the best alignment in the areas of the errors such as comparing the unknown glyphs with other now known glyphs in order to identify the unknown glyphs or rerunning the comparison algorithm in the areas of the errors with other parameters for the image processing stages (binarization, classification of inter-word and intra-word spacing etc.), or taking the second best optimal alignment and performing the above steps of blocks 48-52 again. Alternatively, the glyphs 16 which do not match the alignment may be ignored.

The assisted OCR system 10 is operative to derive the layout of at least part of the certain (known) text 34 (FIG. 1) as arranged in the image of the text document 14 (FIG. 1) by assigning, some or all of, the characters 38 (FIG. 1) of the text file 32 (FIG. 1) to the glyphs 16 (FIG. 1) based on the best alignment determined in block 46 and the error correction of block 54 (block 56). The position of the characters 38 as arranged in the text document 14 is then derived from the positions of the glyphs 16 calculated in block 18.

The layout is therefore derived based on: (a) assigning at least some (typically all the letters of the alphabet included in the text file 32 (FIG. 1)) of the characters 38 (FIG. 1) of the text file 32 of the certain (known) text 34 (FIG. 1) to the relevant glyphs 16 (FIG. 1) of the image of the text document 14 (FIG. 1) according to the best alignment; (b) the position of each of the relevant glyphs 16 in the image of the text document 14; and, if relevant (c) results of the error correction stage.

One application of the assisted OCR system 10 is watermark detection. When detecting a covert watermark which has been embedded into a document (one that imperceptibly and covertly affects the graphical representation of the document), it is often required to be able to detect (extract) the watermark from a document in an image file. Specifically, it may be required to find the exact graphical position of each character in the image, in order to measure modifications introduced by the watermark such as: changes to the font; subtle changes to spacing of characters, words, lines, paragraphs and page margins size etc.; and the addition or removal of a few words from the document. Detecting such a watermark typically requires the detection of a known text inside an image, without any knowledge about the used font(s) or anything about the graphical layout of the text.

Therefore, the assisted OCR system 10 may be operative to extract a watermark embedded in the image of the text document 14 (FIG. 1) based on the layout of at least part of the certain (known) text 34 (FIG. 1) as arranged in the image of the text document 14.

Another application is assisted OCR where determining the formatting of a known text is important, for example, but not limited to, studying the formatting of fourteenth century bible or Shakespeare play which has a known text.

It should be noted that even if the assisted OCR system 10 has knowledge of the font(s) included in the image of the text document 14, the assisted OCR system 10 still provides a useful system and method for determining the layout of the certain (known) text 34 as arranged in the image of the text document 14.

FIGS. 3-9 now describe how the best alignment is determined.

As described above with reference to FIG. 2, comparing the arrays 28, 42 may include applying a longest common subsequence matching algorithm with the array 28 and the array 42 as input in order to find the best alignment. When the longest common subsequence matching algorithm is applied, a matching score is calculated for each possible alignment. The common subsequence with a highest matching score is then selected as the common subsequence determining the best alignment. FIGS. 3 and 4 show two possible alignments of the arrays 28, 42 without skipping. FIG. 5 shows another possible alignment with skipping. FIG. 6 shows another possible alignment with skipping and mismatches.

Reference is now made to FIG. 3, which is a first example showing comparing the two arrays 28, 42 of word-lengths 40, 44 for use in the system 10 of FIG. 1.

FIG. 3 shows one possible alignment between the arrays 28, 42. The matching score increases according to how many of the word lengths 40, 44 match in a common subsequence between the arrays 28, 42. In the example of FIG. 3, each matching word-length 40, 44 receives a scores of 1, giving a total matching score of 6. All the 1's in the score line for the possible alignment are then summed to find the matching score for that possible alignment.

Reference is now made to FIG. 4, which is a second example showing comparing the two arrays 28, 42 for use in the system 10 of FIG. 1.

FIG. 4 shows another possible alignment of the arrays 28, 42 giving a total matching score of 5. The possible alignment of FIG. 4 shows shifting the arrays 28, 42 relative to each other without allowing for any skips in either of the arrays 28, 42.

Reference is now made to FIG. 5, which is a third example showing comparing the two arrays 28, 42 for use in the system 10 of FIG. 1.

FIG. 5 shows skipping values in the array 42 in order to find exact matches for the array 28. Skipping values in the array 28 and/or the array 42 may allow for a better match between the two arrays 28, 42.

Reference is now made to FIG. 6, which is a fourth example showing comparing the two arrays 28, 42 for use in the system 10 of FIG. 1.

FIG. 6 shows skipping values in the array 42 as well as allowing for mismatches for some of the word lengths 40, 44. Skips and mismatches are allowed when performing the comparing step in order to take into account small changes in the image of the text document 14 (FIG. 1) due to errors or formatting issues such as breaking a single word over two lines using a hyphen. A mismatch could be considered comparable to a skip in both arrays.

Skips and mismatches do not receive a negative score in the example of FIG. 6. However, it can be seen that matching an array in a very large array could lead to spurious results as it may always be possible to find an exact match for a certain word length array in a large enough word array by skipping.

Figures 7, 8, 9, 10:
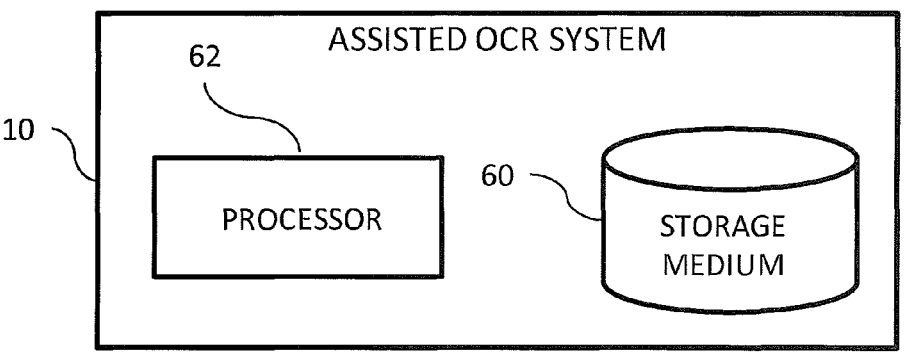
FIG. 7 is a fifth example showing comparing two word length arrays for use in the system of FIG. 1.
FIG. 8 is a sixth example showing comparing two word length arrays for use in the system of FIG. 1.
FIG. 9 is a seventh example showing comparing two word length arrays for use in the system of FIG. 1.
FIG. 10 is a block diagram view of the system of FIG. 1.

Reference is now made to FIG. 7, which is a fifth example showing comparing the two arrays 28, 42 for use in the system 10 of FIG. 1.

FIG. 7 adds another enhancement to the LCS matching algorithm whereby skipping is penalized by giving a negative score, $-a$, to each skip so that the matching score decreases according to how many words are skipped in the array 28 and/or array 42 in order to find the common subsequence. The parameter 'a' may have any suitable positive value for example, but not limited to, 0.5 or 1. A mismatch may be treated as a skip in both sequences that receives a double negative score of $-2a$ as shown in FIG. 7.

Reference is now made to FIG. 8, which is a sixth example showing comparing the two arrays 28, 42 for use in the system 10 of FIG. 1.

FIG. 8 shows another possible alignment of the arrays 28, 42 while applying a penalty for skips.

Reference is now made to FIG. 9, which is a seventh example showing comparing the two arrays 28, 42 for use in the system 10 of FIG. 1.

As a further enhancement to the LCS matching algorithm, the LCS algorithm is applied multiple times such that one of the arrays (typically the longer one, in the example of FIG. 9, array 42) is shortened by one element each time the algorithm is applied and the other array (typically the shorter one, in the example of FIG. 9, array 28) stays the same each time. At the completion of the process, the alignment with the highest matching score is selected.

The array which is shortened may be shortened from the beginning or end of the array depending on where the matching algorithm normally starts processing from. FIG. 9 shows that the array 42 has been shortened by the portion 58 from the end of the array 42 and not from the beginning of the array 42. If the matching is normally processed from the beginning of the arrays 28, 42, then the array which is shortened is shortened from the beginning only, and vice-versa. The reason for this additional step is the penalty introduced for skipping described with reference to FIGS. 7 and 8. The penalty is introduced in order to find the tightest match, but as a by-product it also creates a bias favoring the side of the array where the algorithm starts from (either the beginning or end of the array, as appropriate), whereby the matching score is penalized for each skip taken towards the other direction. This further enhancement eliminates that bias by trying all the possibilities for the starting point of the algorithm in the array which is shortened.

Another way to view the above is that the comparing step includes applying the longest common subsequence matching algorithm such that a portion 58 (either the beginning or end) of the array 28 and/or the array 42 does not contribute to decreasing the matching score, and the comparing includes changing the length of the portion 58 each time that the longest common subsequence matching algorithm is applied.

The fact that all sequences of the array which is shortened are subsequences of the array which is shortened, allows using a memorization matrix (explained below) which is the same for all applications of the LCS matching algorithm, thereby minimizing processing resources while producing accurate results.

The classic memorization matrix of LCS for an array X and an array Y, contains the rating given to each (i, j) pair, by calculating LCS(Xi, Yj), Xi being the first i cells of X and Yj being the first j cells of Y. Another piece of information is added to the cells of this matrix—the "direction" from which the best result came (diagonal (i−1, j−1), left (i, j−1) or up (i−1, j)). This step allows the assisted OCR system 10, after receiving the final result of LCS, to "trace back" and extract the individual word matches ((i,j) pairs) that comprise the LCS.

One of the arrays 28, 42, typically the shorter one, is defined as the pattern, P, and the one of the other arrays 28, 42, typically the longer one, is defined as the target, T.

Using a concise mathematical formulation, when the end of one of the arrays 28, 42 is shortened, for strings T and P, LCS(P,T) denotes the longest common subsequence of T and P and $\overline{LCS}$(P,T) denotes the number of elements (e.g.: word lengths) that are skipped in the LCS calculation of P and T. The parameter a denotes some penalty constant and T[0,t] denotes the first t elements (e.g.: word lengths) of T.

The following formula is now defined penalized LCS (PLCS):

$$PLCS(T, P) = \max_t LCS(T[0, t], P) - a(\overline{LCS}(T[0, t], P))$$

It should be noted that the PLCS function may be calculated via dynamic programming, in a manner similar to the calculation of the LCS function.

Reference is now made to FIG. 10, which is a block diagram view of the system 10 of FIG. 1.

The assisted OCR system 10 typically includes a storage medium 60 to store computer program code and a processor 62 to execute the computer program code. The computer program code, when executed, is operative to perform the steps described above with reference to FIGS. 1-9.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. An assisted OCR method, comprising:
  receiving an image file including an image of a text document, the image of the text document including a plurality of glyphs;
  determining a position of each of the glyphs in the image of the text document;
  determining a spacing of the glyphs in the image of the text document;
  identifying word boundaries in the image of the text document from the spacing of the glyphs thereby implying the existence of a first plurality of words in the image of the text document, each one of the first plurality of words having a word length measured by the number of glyphs in the one word;
  preparing a first array of word lengths based on the word length of each of the first plurality of words, the first array being ordered according to the order in which the first plurality of words appear in the image of the text document;
  receiving a text file including a certain text, the text file including a second plurality of words and a plurality of characters, each of the second plurality of words having a word length;
  preparing a second array of word lengths based on the word length of each of the second plurality of words, the second array being ordered according to the order in which the second plurality of words appear in the text file;
  comparing at least part of the first array of word lengths to at least part of the second array of word lengths in order to find a best alignment between the first array of word lengths and the second array of word lengths;

selecting a letter of an alphabet included in the characters of the text file;

selecting some of the glyphs of the image of the text document that correspond to the selected letter of the alphabet based on the best alignment;

comparing the selected glyphs with each other to provide a level of confidence in the best alignment;

deriving a layout of at least part of the certain text as arranged in the image of the text document at least based on the position of each of the at least some glyphs in the image of the text document and assigning at least some of the characters of the text file of the certain text to at least some of the glyphs of the image of the text document according to the best alignment; and extracting a watermark embedded in the image of the text document.

2. The method according to claim 1, wherein the comparing includes applying a longest common subsequence matching algorithm with the first array and the second array as input in order to find the best alignment.

3. The method according to claim 1 wherein the comparing includes applying a penalized longest common subsequence matching algorithm including calculating a matching score which: increases according to how many of the word lengths match in a common subsequence; and decreases according to how many words are skipped in the first and/or second array in order to find the common subsequence, the common subsequence with a highest matching score being selected as the common subsequence determining the best alignment.

4. The method according to claim 1, wherein the comparing includes applying a penalized longest common subsequence matching algorithm including calculating a matching score which: increases according to how many of the word lengths match in a common subsequence; and decreases according to how many words are skipped in the first and/or second array in order to find the common subsequence such that a portion of the first array and/or the second array does not contribute to decreasing the matching score, the common subsequence with a highest matching score being selected as the common subsequence determining the best alignment.

5. The method according to claim 4, wherein: the penalized longest common subsequence matching algorithm is applied multiple times; and the comparing includes changing a length of the portion of the first array and/or the second array each of the times that the penalized longest common subsequence matching algorithm is applied.

6. The method according to claim 1, wherein the extracting the watermark embedded in the image of the text document is based on the layout of the at least part of the certain text as arranged in the image of the text document.

7. An assisted OCR system, comprising: a non-transitory storage medium to store computer program code; and a processor to execute the computer program code, the processor, when executing the computer program code, performing the following:

receiving an image file of an image of a text document, the image of the text document including a plurality of glyphs;

determining a position of each of the glyphs in the image of the text document;

determining a spacing of the glyphs in the image of the text document;

identifying word boundaries in the image of the text document from the spacing thereby implying an existence of a first plurality of words in the image of the text document, each one of the first plurality of words having a word length measured by the number of characters in the one word;

preparing a first array of word lengths based on the word length of each of the first plurality of words, the first array being ordered according to the order in which the first plurality of words appear in the image of the text document;

receiving a text file including a certain text, the text file including a second plurality of words and a plurality of characters, each of the second plurality of words having a word length;

preparing a second array of word lengths based on the word length of each of the second plurality of words, the second array being ordered according to the order in which the second plurality of words appear in the text file;

comparing at least part of the first array of word lengths to at least part of the second array of word lengths in order to find a best alignment between the first array of word lengths and the second array of word lengths;

assigning at least some of the characters of the text file of the certain text to at least some of the glyphs of the image of the text document based on the best alignment;

selecting a letter of an alphabet included in the characters of the text file;

selecting some of the glyphs of the image of the text document that correspond to the selected letter of the alphabet based on the best alignment;

comparing the selected glyphs with each other to provide a level of confidence in the best alignment;

deriving a layout of at least part of the certain text as arranged in the image of the text document at least based on the position of each of the at least some glyphs in the image of the text document and assigning at least some of the characters of the text file of the certain text to at least some of the glyphs of the image of the text document according to the best alignment; and extracting a watermark embedded in the image of the text document.

8. The system according to claim 7, wherein the comparing includes applying a longest common subsequence matching algorithm with the first array and the second array as input in order to find the best alignment.

9. The system according to claim 7, wherein the comparing includes applying a penalized longest common subsequence matching algorithm including calculating a matching score which: increases according to how many of the word lengths match in a common subsequence; and decreases according to how many words are skipped in the first and/or second array in order to find the common subsequence, the common subsequence with a highest matching score being selected as the common subsequence determining the best alignment.

10. The system according to claim 7, wherein: the comparing includes applying a penalized longest common subsequence matching algorithm including calculating a matching score which: increases according to how many of the word lengths match in a common subsequence; and decreases according to how many words are skipped in the first and/or second array in order to find the common subsequence such that an initial portion of the first array and/or the second array does not contribute to decreasing the matching score, the common subsequence with a highest matching score being selected as the common subsequence determining the best alignment.

11. The system according to claim 10, wherein: the penalized longest common subsequence matching algorithm is applied multiple times; and the comparing includes changing a length of the initial portion of the first array and/or the second array being each of the times that the penalized longest common subsequence matching algorithm is applied.

12. The system according to claim 7, wherein the extracting the watermark embedded in the image of the text document is based on the layout of the at least part of the certain text as arranged in the image of the text document.

* * * * *